United States Patent
Vogler

(10) Patent No.: US 10,046,518 B2
(45) Date of Patent: Aug. 14, 2018

(54) ULTRASONIC PROCESSING SYSTEM HAVING A PIEZOELECTRIC FORCE SENSOR

(71) Applicant: Herrmann Ultraschalltechnik GmbH & Co. KG, Karlsbad (DE)

(72) Inventor: Ulrich Vogler, Uhldingen-Muhlhofen (DE)

(73) Assignee: Herrmann Ultraschalltechnik GmbH & Co. KG, Karlsbad (DE)

( * ) Notice: Subject to any disclaimer, the term of this patent is extended or adjusted under 35 U.S.C. 154(b) by 0 days.

(21) Appl. No.: 15/503,923

(22) PCT Filed: Nov. 3, 2015

(86) PCT No.: PCT/EP2015/075529
§ 371 (c)(1),
(2) Date: Feb. 14, 2017

(87) PCT Pub. No.: WO2016/074983
PCT Pub. Date: May 19, 2016

(65) Prior Publication Data
US 2017/0282448 A1 Oct. 5, 2017

(30) Foreign Application Priority Data

Nov. 11, 2014 (DE) .................. 10 2014 116 474

(51) Int. Cl.
*B32B 37/00* (2006.01)
*B29C 65/00* (2006.01)
*G01L 1/16* (2006.01)
*B29C 65/08* (2006.01)

(52) U.S. Cl.
CPC ...... *B29C 66/92211* (2013.01); *B29C 65/086* (2013.01); *B29C 66/4312* (2013.01);
(Continued)

(58) Field of Classification Search
CPC . B29C 65/08; B29C 65/086; B29C 66/92211; B29C 66/4312; B29C 66/83511; B29C 66/961; G01L 1/16
(Continued)

(56) References Cited

U.S. PATENT DOCUMENTS

| 6,190,296 B1 | 2/2001 | Gnad et al. |
| 7,868,518 B2 | 1/2011 | Gnad et al. |

(Continued)

FOREIGN PATENT DOCUMENTS

| DE | 10 2006 020 417 A1 | 11/2007 |
| DE | 10 2007 054 626 A1 | 5/2009 |

(Continued)

OTHER PUBLICATIONS

Nora Lindner, International Preliminary Report on Patentability, PCT/EP2015/075529, World Intellectual Property Organization, dated May 26, 2017.

*Primary Examiner* — James Sells
(74) *Attorney, Agent, or Firm* — Paul & Paul

(57) ABSTRACT

The present invention concerns an apparatus for ultrasonic processing of materials having an ultrasonic processing system comprising an ultrasound generator, a converter, a sonotrode and a counterpart tool and a feed unit with which the sonotrode and the counterpart tool can be moved towards each other or away from each other, wherein there is provided a force sensor with which the force that the ultrasonic processing system exerts on the materials to be processed can be measured. To provide a corresponding ultrasonic processing apparatus which allows a greater processing speed it is proposed according to the invention that the force sensor is a piezoelectric sensor whose output is converted into an electrical voltage by means of a charge amplifier and that there is provided a control device which either when the ultrasonic processing is not performing (Continued)

material processing short-circuits the piezoelectric sensor or adds a time-varying force compensation unit to the value measured by the piezoelectric sensor.

8 Claims, 1 Drawing Sheet

(52) U.S. Cl.
CPC ...... B29C 66/83511 (2013.01); B29C 66/961 (2013.01); G01L 1/16 (2013.01)

(58) Field of Classification Search
USPC ........................................................ 156/580.1
See application file for complete search history.

(56) References Cited

U.S. PATENT DOCUMENTS

| | | |
|---|---|---|
| 8,408,445 B1 | 4/2013 | Cai et al. |
| 8,783,545 B2 | 7/2014 | Hesse et al. |
| 8,858,742 B2 * | 10/2014 | Spicer ...................... B06B 3/00 156/351 |
| 2007/0251977 A1 | 11/2007 | Gnad et al. |
| 2013/0112332 A1 * | 5/2013 | Spicer .................... B23K 20/10 156/64 |
| 2014/0338814 A1 * | 11/2014 | Klinstein ............ B29C 66/0242 156/64 |
| 2015/0068660 A1 * | 3/2015 | Wang ..................... B29C 65/08 156/64 |
| 2016/0332364 A1 | 11/2016 | Vogler |

FOREIGN PATENT DOCUMENTS

| | | |
|---|---|---|
| DE | 10 2012 217 437 A1 | 4/2013 |
| EP | 0920977 A1 | 6/1999 |
| EP | 1849531 A2 | 10/2007 |
| WO | 2015 128236 A1 | 9/2015 |

* cited by examiner

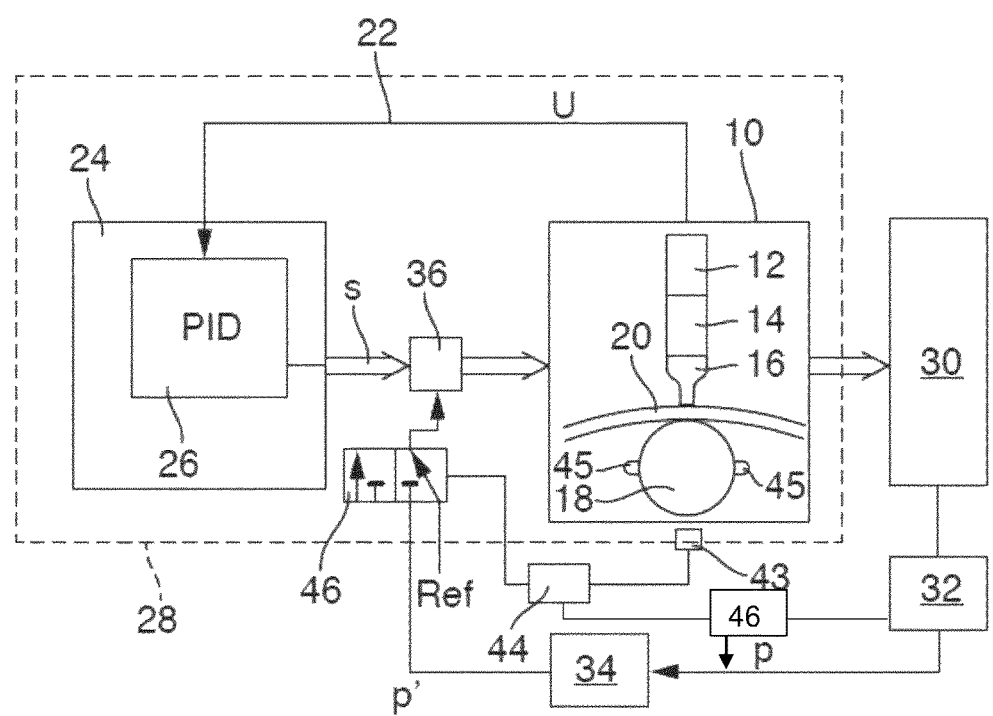

ULTRASONIC PROCESSING SYSTEM HAVING A PIEZOELECTRIC FORCE SENSOR

CROSS-REFERENCE TO RELATED APPLICATION

This application is a 371 national stage application of International Application PCT/EP2015/075529, filed Nov. 3, 2015, and claims the priority of German Application No. 10 2014 116 474.1, filed on Nov. 11, 2014.

The present invention concerns an apparatus for processing materials with an ultrasonic processing system. The ultrasonic processing system has an ultrasound generator, a converter, a sonotrode and a counterpart tool. In many cases an amplitude transformer is additionally arranged between the converter and the sonotrode.

The ultrasound generator generates an electrical ac voltage which is converted by means of the converter into an acoustic ultrasonic vibration whose frequency is so adapted to the sonotrode that it is put into a state of resonance vibration. For processing the desired materials they are arranged between the sonotrode on the one hand and the counterpart tool on the other hand. The sonotrode which is excited with an ultrasonic vibration then presses the material against the counterpart tool and processes it.

Particularly in the processing of material webs the sonotrode and/or the counterpart tool is provided with a sealing surface which is substantially cylindrical or part-cylindrical and is rotated about the cylinder axis during the processing operation. In that case the peripheral speed of the cylindrical or part-cylindrical sealing surface generally coincides with the material feed speed.

Frequently the sonotrode and/or the counterpart tool has a corresponding carrier surface having structures like for example a raised portion which projects above the carrier surface. The top sides of the structures then form the above-mentioned sealing surface. When processing the material the structure is transferred into the material.

Thus for example the raised portion may be of an elongate or rib-shaped configuration and extend on the sealing surface in the axial direction. It will be appreciated that other forms of raised portions like for example point-form or circular raised portions are also possible.

The invention is described hereinafter by means of the example of a raised portion on the counterpart tool. It will be understood however that instead or in addition the raised portion may be disposed on the sonotrode. It will be appreciated that it is also possible to provide a plurality of raised portions. During processing a sealing effect takes place whenever the vibrating sonotrode exerts a force on the raised portion by way of the material.

By way of example transverse sealing seams can be produced in the material webs in the above-described manner with elongate raised portions extending transversely relative to the material web. Whenever the elongate raised portion arranged on the counterpart tool is arranged opposite the sonotrode a transverse sealing seam is then produced.

The use of raised portions however also has the result that the force exerted on the counterpart tool by the sonotrode by way of the material abruptly increases whenever a raised portion is positioned opposite the sonotrode, in the rotation of the counterpart tool. That involves the vibrating system being coupled to the counterpart tool. The vibration of the sonotrode is thereby damped and the natural frequency of the sonotrode is altered.

To achieve a welding result which is as uniform as possible it is necessary to maintain a constant predetermined welding force during the welding operation, that is to say when the raised portion comes into contact with the material to be processed. As however the welding force can vary by virtue of the fluctuations in material thickness, but also because of thermal expansion of the ultrasonic vibration system, the known systems have a force sensor which by means of strain gauges measures the force applied to the web of material by the sonotrode or the counterpart tool. The measured force can then be compared to the desired reference value and, if a deviation is detected between the actual and reference values, the relative position of the sonotrode can be so adapted by means of a feed unit that the welding force is increased or reduced, depending on how the deviation between the actual value and the reference value has turned out.

In that respect the control system is capable of very reliably reacting to gradual changes in the system, for example temperature changes and the change in length of the sonotrode, that is linked thereto.

However limits are imposed on the control action in particular in the case of abrupt variations. Particularly in the case of load changes, that is to say whenever the raised portion comes into processing engagement with the material, the welding force abruptly changes.

It has therefore already been proposed in DE 10 2006 020 417 that a process parameter is ascertained from the processing process and the processing parameter ascertained in that way is linked to the adjusting parameter of the control system.

For example the process parameter can be the force of the sonotrode on the material which is generally proportional to the sonotrode processing force. If it is established during operation that the deflection or processing force of the sonotrode rises, which will be the case in particular when the raised portion comes into processing engagement, then the change is added to the adjusting parameter possibly after suitable scaling. In that way the disturbance to the vibration amplitude by virtue of the load changes can be considerably reduced.

It will be noted however that fluctuations in the vibration amplitude occur. Thus after the raised portion has come into engagement with the material but also after the raised portion has come out of engagement with the material again, post-vibration phenomena occur. That is substantially because the abrupt increase or reduction in load and the abrupt elastic deformation or relaxation, linked thereto, of the holding means of the sonotrode including the feed unit and including the sensor based on strain gauges, the sonotrode performs a damped vibration about its rest position.

Particularly when two transverse sealing seams are to be produced in quick succession, that is to say two axially extending raised portions are disposed on the counterpart tool, the welding cycle frequency linked thereto can be of an order of magnitude at which the holding means also exhibits resonance.

A non-optimum welding force and therewith an unacceptable welding result is the consequence.

A limit is therefore imposed on the increase in the processing speed due to the elasticity of the holding system.

Taking the described state of the art as the basic starting point therefore the object of the present invention is to provide a corresponding ultrasonic processing apparatus which allows a greater processing speed.

According to the invention that object is attained in that the force sensor is a piezoelectric sensor. The stiffness of piezoelectric sensors in comparison with the strain gauge-based force sensors is greater by a factor of between 70 and 100.

Therefore, solely by using piezoelectric sensors instead of strain gauge-based force measuring sensors it is possible to considerably reduce the elasticity of the system and thus the post-vibration of the sonotrode.

The piezoelectric sensors however are deemed to be unsuitable for static force measurements as, by virtue of the structure of the piezoelectric sensors or the use of a charge amplifier for measuring the charge produced by the piezoelectric crystal, a discharge always occurs so that the charge measured by the charge amplifier and which is converted into an electrical voltage decreases in the case of static measurements.

Therefore the ultrasonic processing apparatuses in the state of the art dispense with the use of piezoelectric sensors as force measuring devices.

In order nonetheless to be able to use the piezoelectric sensors there is further provided in accordance with the invention a control device which either short-circuits the piezoelectric sensor when the ultrasonic processing system is not performing any material processing or adds a time-varying force compensation value to the force measured by the piezoelectric sensor.

It is thus possible for example to short-circuit the piezoelectric sensors now and then, more specifically at a moment at which the raised portions are not in material engagement, that is to say at a moment at which no welding is occurring. At that moment the sonotrode is exerting no or only a slight force on the material web. Due to the short-circuiting the piezoelectric sensor is so-to-speak zeroed so that after the short-circuiting operation only changes in force can be measured. It has been found however that in operation of the ultrasonic processing apparatus the measurement of an exact force value is actually less important—that is set once when starting the processing operation—but it is primarily measurement of the force differences that is the important consideration.

In a similar manner, it is also possible instead to add a time-varying force compensation value to the voltage provided by the charge amplifier. If for example it is known that at room temperature the piezoelectric sensor used has a drift of about 48 N/h, a correspondingly rising force compensation value can be added.

In that way the signal delivered by the piezoelectric sensor is corrected to obtain a measurement value of the utmost accuracy.

By virtue of the described measure it is now possible to use piezoelectric sensors for force measurement in ultrasonic processing apparatuses and in that case to profit from the stiffness which is high in comparison with strain gauges.

In a particularly preferred embodiment the sonotrode and/or the counterpart tool have a substantially cylindrical carrier surface having at least one raised portion and is rotatable so that during processing the raised portion rotates about the axis of rotation and during a sealing time comes into contact with the material web, wherein there is provided a trigger device which determines the position of the raised portion, wherein the control device is so adapted that it short-circuits the piezoelectric sensor in dependence on position determination.

For example the control device can be so adapted that it short-circuits the piezoelectric sensor when the raised portion is not in contact with the material to be processed.

It will be understood that short-circuiting does not have to occur each time when the raised portion comes out of engagement with the material to be processed.

Thus for example in a preferred embodiment it could be provided that the control device is so adapted that it short-circuits the piezoelectric sensor whenever for whatever reasons there is an interruption in material processing, for example due to a fault or a change in the roll of material.

It could also be provided in a preferred embodiment that the control device is so adapted that it short-circuits the piezoelectric sensor when a predetermined period of time after the last short-circuiting has expired.

In will be appreciated that short-circuiting should be effected when the raised portion is not in contact with the material to be processed. If the counterpart tool has so many raised portions that in principle a raised portion comes into contact with the web of material at every moment in time then preferably the sonotrode is moved away from the material web for the short-circuiting procedure so that there is no force at the piezoelectric sensor.

As an alternative thereto a control device could also be so adapted that it short-circuits the piezoelectric sensor when the trigger device has registered the predetermined number of contacts between the material and the raised portion.

In a further preferred embodiment it is provided that the control device both short-circuits the piezoelectric sensor now and then and also adds a time-varying force compensation value to the force value measured by the piezoelectric sensor. That measure means that the time interval between the individual short-circuits can be increased.

Whenever a short-circuit has occurred the force compensation value is reset to zero. The force compensation value then takes account of whether a drift occurs as from the moment of the short-circuit. In general a linear force compensation in respect of drift will suffice by virtue of that measure. Admittedly the drift is non-linear but within short times after short-circuiting of the piezoelectric sensor linear compensation is sufficient for the purposes of the present invention. The force compensation value can be derived for example from a previously performed measurement of the drift of the piezoelectric sensor.

Further advantages, features and possible uses of the present invention will be clearly apparent from the description hereinafter of a preferred embodiment and the accompanying FIGURE in which:

FIG. 1 shows a diagrammatic view of an apparatus according to the invention.

FIG. 1 shows a circuit diagram of an ultrasonic processing apparatus according to the invention. It has a processing system 10 having a converter 12, an amplitude transformer 14, an ultrasonic sonotrode 16 and a counterpart tool 18. In that respect the converter 12, the amplitude transformer 14 and the counterpart tool 18 form a vibrating system. The material to be processed like for example a material web is arranged between the sonotrode 16 and the counterpart tool 18. The converter 12 is supplied with an ac voltage by means of an ultrasound generator (not shown). Signals (u) are taken from the processing system 10 and fed to a closed-loop control device 24 by way of a feedback section 22. That control device 24 has a PID controller 26. The control device 24 produces an adjustment value (s) which is fed to the processing system 10 and in particular the converter 12. The processing system 10 with the control device 24 forms a controlled electrical and mechanical oscillating circuit 28. The control device 24 can be integrated in the ultrasound generator.

Reference 30 denotes a processing process, in particular a welding process, which is outside the oscillating circuit 28 as it is not influenced directly by the electrical and mechanical parameters. That processing process 30 is connected to a force sensor 32 with which the pattern of the welding force is detected. According to the invention that force sensor 32 is in the form of a piezoelectric sensor. The force sensor 32 ascertains a process parameter (p) which is fed to a scaling unit 34. The scaling unit 34 delivers a scaled process parameter (p') which is fed to a connection location. That connection location is disposed between the control device 24 and the processing system 10 so that not only the scaled process parameter (p') but also the adjustment value (s) is fed to the connection location 36. The parameters (p') and (s) which are linked together are fed to the processing system 10 and in particular the ultrasound generator.

It will be seen that the carrier surface of the counterpart tool 18 which is in the form of a roller has two oppositely disposed raised portions 45 forming the sealing surface. They can be for example elongate ribs disposed in the axial direction. In processing of the material web 20 the counterpart tool 18 is rotated about its axis so that the two raised portions 45 come successively into contact with the material web 20 and provide for producing a transverse sealing seam when the material web is clamped between the sonotrode 16 and the raised portion 45.

Whenever one of the two projections 45 is pressed against the sonotrode 16 by way of the material web 20 that will have the result that an abrupt change in the force is measured by way of the force sensor 32. If however the welding force increases the sonotrode must provide a corresponding counteracting force, that is to say the situation entails a slight elastic deformation of the sonotrode holder, the feed unit (not shown) connected to the sonotrode holder and the pressure sensor arranged within the force section. As soon as the raised portion 45 no longer presses against the sonotrode 16 the sonotrode will move back again into its original position.

By virtue of the described elastic property inter alia of the force sensor however that will lead to a vibrational overshoot so that the time pattern of the welding force is in the form of a damped vibration. As however the welding force is continuously measured by way of the force sensor 32 then in the state of the art the changed welding force is also fed uninterruptedly by way of the connection location 36 so that, even when the raised portion 45 is not in contact with the material web 20, the damped vibration is fed as a scaled process parameter (p') to the connection location and influences the control. In accordance with the invention therefore there is provided a trigger device 44 which determines the position of the raised portion 45 by means of a position sensor 43 and short-circuits the piezoelectric sensor in dependence on the determining operation performed by the control device, wherein in this embodiment the switch 46 is additionally actuated so that the connection location 36 is connected either to the scaled process parameter p' or to a constant reference value REF.

In this embodiment the connection location 36 is connected to the constant reference value REF whenever the raised portions 45 no longer exert any force on the sonotrode 16. Basically at the same time the piezoelectric sensor can be short-circuited. Any changes in the welding force which occur without being influenced by the raised portions 45 do not take place abruptly and can be regulated out by means of the control device 34. In that respect the reference value is so established that it corresponds to the scaled process parameter p' which corresponds to the parameter measured immediately prior to linking to the process value.

According to the invention there is provided here a control device 46 connected to the trigger device 44. The control device 46 short-circuits the force sensor 32 which is in the form of a piezoelectric sensor, whenever the trigger device signals that the raised portion 45 is not in contact with the material web. After the short-circuiting a time-varying compensation force value is added to the measurement signal provided by the force sensor 32 in order to compensate for the intrinsic drift of the piezoelectric sensor between two short-circuiting operations.

LIST OF REFERENCES 10 processing system
12 converter
14 amplitude transformer
16 ultrasonic sonotrode
18 counterpart tool
20 material web
22 feedback section
24 closed-loop control device
26 PID controller
28 oscillating circuit
30 processing process, welding process
32 force sensor
34 scaling unit
36 connection location
43 position sensor
44 trigger device
45 raised portion
46 control device
REF reference value
u signals
p process parameter
p' scaled process parameter

The invention claimed is:

1. Apparatus for ultrasonic processing of materials having an ultrasonic processing system comprising an ultrasound generator, a converter, a sonotrode and a counterpart tool and a feed unit with which the sonotrode and the counterpart tool can be moved towards each other or away from each other, wherein there is provided a force sensor with which the force that the ultrasonic processing system exerts on the materials to be processed can be measured, characterised in that the force sensor is a piezoelectric sensor whose output is converted into an electrical voltage by means of a charge amplifier and that there is provided a control device which either when the ultrasonic processing is not performing material processing short-circuits the piezoelectric sensor or adds a time varying force compensation unit to the value measured by the piezoelectric sensor.

2. Apparatus as set forth in claim 1 characterised in that the sonotrode and/or the counterpart tool have a substantially cylindrical carrier surface having at least one raised portion and is rotatable so that during processing the raised portion rotates about the axis of rotation and during a sealing time comes into contact with the material web, wherein there is provided a trigger device which determines the position of the raised portion, wherein the control device is so adapted that it short-circuits the piezoelectric sensor in dependence on position determination.

3. Apparatus as set forth in claim 2 characterised in that the control device is so adapted that it short-circuits the piezoelectric sensor when the raised portion is not in contact with the material to be processed.

4. Apparatus as set forth in claim 3 characterised in that the control device is so adapted that it short-circuits the piezoelectric sensor when a predetermined period of time has expired.

5. Apparatus as set forth in claim 3 characterised in that the control device is so adapted that it short-circuits the piezoelectric sensor when the trigger device has registered a predetermined number of contacts between the material and the raised portion.

6. Apparatus as set forth in claim 1 characterised in that the control device both short-circuits the piezoelectric sensor when the ultrasonic processing system is not performing any material processing and also adds a time-varying force compensation value to the value measured by the piezoelectric sensor.

7. Apparatus as set forth in claim 1 characterised in that the force compensation value is derived from a previously performed measurement of the drift of the piezoelectric sensor.

8. Apparatus as set forth in claim 6 characterised in that the force compensation value is derived from a previously performed measurement of the drift of the piezoelectric sensor.

* * * * *